(12) United States Patent
Thuruthumaly et al.

(10) Patent No.: US 7,373,830 B2
(45) Date of Patent: May 20, 2008

(54) METAL/THERMO PLASTIC PORT DESIGN FOR MEDIA ISOLATED PRESSURE TRANSDUCERS

(75) Inventors: Thomas T. Thuruthumaly, Rockford, IL (US); Lamar F. Ricks, Lewis Center, OH (US); William S. Hoover, Plain City, OH (US)

(73) Assignee: Honeywell International Inc., Morristown, NJ (US)

( * ) Notice: Subject to any disclaimer, the term of this patent is extended or adjusted under 35 U.S.C. 154(b) by 39 days.

(21) Appl. No.: 11/410,643

(22) Filed: Apr. 25, 2006

(65) Prior Publication Data
US 2007/0245830 A1    Oct. 25, 2007

(51) Int. Cl.
*G01L 7/00* (2006.01)
(52) U.S. Cl. .......................................... 73/714; 73/756
(58) Field of Classification Search ................. 73/756, 73/714
See application file for complete search history.

(56) References Cited

U.S. PATENT DOCUMENTS

| 4,773,269 | A | 9/1988 | Knecht et al. ............... 73/706 |
| 5,880,372 | A | 3/1999 | Nasiri ........................ 73/726 |
| 6,076,409 | A | 6/2000 | Bang ........................... 73/756 |
| 6,311,561 | B1 | 11/2001 | Bang et al. .................. 73/708 |
| 6,349,735 | B2 * | 2/2002 | Gul ........................ 137/15.09 |
| 6,612,180 | B1 * | 9/2003 | Kurtz .......................... 73/754 |
| 2001/0039964 | A1 * | 11/2001 | Gul .............................. 137/360 |

* cited by examiner

*Primary Examiner*—Andre J. Allen
(74) *Attorney, Agent, or Firm*—Richard H. Krukar; Luis M. Ortiz; Kermit D. Lopez

(57) ABSTRACT

A pressure sensor port apparatus and method comprising a pressure port that includes a hexagonal area preferably comprising a plastic material (e.g., thermoplastic). Additionally, one or more electronic interconnections can be associated with the pressure sensor port, such that the electronic interconnections are isolated from sensed media while providing a pressure sensor port apparatus based on a cost effective injection molding process rather than a machining processes required for a metal.

16 Claims, 2 Drawing Sheets

METAL/THERMO PLASTIC PORT DESIGN FOR MEDIA ISOLATED PRESSURE TRANSDUCERS

TECHNICAL FIELD

Embodiments are generally related to sensing devices and methods there of. Embodiments are also related to pressure transducers. Embodiments are also related to port components utilized in pressure sensing devices.

BACKGROUND OF THE INVENTION

Many processes and devices have been used for pressure sensing. Pressure sensors or pressure transducers are used in a wide range of applications. In many cases, it is desirable to measure the pressure of fluid media which may be harmful or corrosive to the transducer material, such as water, fuel, oil, acids, bases, solvents, other chemicals, and corrosive gases. There are numerous high-volume applications where a media compatible pressure transducer is highly desired but not available in any currently available technology with satisfactory durability, performance, or price characteristics. There is a need for media compatible pressure sensor packages which have substantial performance and cost advantages over existing technologies and provide new capabilities not previously realized.

Pressure is one of the most commonly measured physical variables. While pressure measuring instruments have been available for many decades, the proliferation of inexpensive solid-state silicon pressure transducers has resulted in tremendous growth in the number and different types of applications of pressure transducers. The most common pressure transducers are solid-state silicon pressure transducers employing a thin silicon diaphragm which is stressed in response to an applied pressure. The stress is measured by piezoresistive elements formed in the diaphragm.

Pressure transducers can also be formed similarly using metal foil diaphragms and thin film stress sensing elements. In some cases, one or two pressure sensing diaphragms are part of a parallel plate capacitor, in which the applied pressure is detected by the change in capacitance associated with the deflection of the loaded plate or plates. Other pressure measurement techniques include spring-loaded members which move in response to an applied pressure. For vacuum pressures there are a wide variety of other pressure measurement techniques.

Pressure transducers can be used to measure pressures in a wide variety of fluid media, including but not limited to: air, nitrogen, industrial process gases, water, automotive fluids, pneumatic fluids, coolants, and industrial chemicals. In many important applications, the media which the pressure transducer must measure is corrosive or damaging to the transducer itself. In these cases, the pressure transducer must either be constructed in such a way that it is resistant to the media of interest, or the transducer must somehow measure the pressure while being physically isolated from the media of interest. To date, pressure sensors are either inadequately protected for media compatibility or are prohibitively expensive for many applications.

Many different types of pressure sensors have been devised. The overwhelming majority of pressure transducers for media compatibility are protected by stainless steel housing, with a single stainless steel diaphragm providing a barrier between the pressure sensing element and the media. The empty volume between the steel diaphragm and the pressure sensing element is filled with a fluid, such as silicone oil. When the steel diaphragm deflects due to an externally applied pressure, the essentially incompressible fluid transmits that pressure to the internal pressure sensing element, which produces a voltage or current signal proportional to the pressure. While these stainless steel packaged pressure transducers are widely used, they have several shortcomings, including relative complexity and high cost.

In some industrial applications the rugged steel housing may be preferred regardless of price, there are numerous high-volume applications for media compatible pressure sensors in which the cost of the steel packages are prohibitively expensive. Also, the steel diaphragms, while thin, are inherently stiff due to the high modulus of steel. This results in a loss of sensitivity to applied pressure which is undesirable for transducer performance, especially at lower applied pressures.

These types of sensors are also inherently sensitive to temperature. A temperature rise causes the internal fluid to expand. Constrained by the steel diaphragm, the pressure of the fluid rises, producing a false pressure reading. This temperature sensitivity is typically corrected with external passive or active electronic components which add to the cost of the transducer. Fourth, the stainless steel material is not satisfactory for many media applications. Stainless steel will eventually corrode in certain environments with harsh acids and bases present. In some applications, such as in the semiconductor industry and biomedical applications, even if the steel is resistant to the chemical substance in question, minute trace amounts of steel or corrosion products released into the media cannot be tolerated. Also, steel housings add substantially to the weight and size of the transducers.

Examples of media isolated pressure transducers are known. One example involves a media compatible device for sensing pressure in which the media compatible pressure sensor utilizes self-aligned components which fit together without the need for adhesives is described. Other examples include relatively small-scale pressure sensing devices which are designed to be placed in close proximity to various substances from which pressure can be measured. In such devices the media compatible packages for pressure sensing devices can include molded polymeric housings and diaphragms which mount and isolate pressure sensing devices in operative contact with any type of corrosive or non-corrosive media for pressure measurement. The various pressure sensor package housings in such devices include a main cavity in which a pressure sensor is mounted, a polymeric diaphragm bonded to the housing within the main cavity, one or more media ports that leads to a pressure port on one side of the diaphragm, and a pressure transfer cavity on an opposite side of the diaphragm in which a pressure sensor is located.

Another example involves a media compatible package for a pressure sensing device is made from a non-corrosive, highly chemical resistant material. Such a package can include a base which holds a printed circuit board having a pressure sensor mounted thereon. A sealing member can be placed on the circuit board encircling the pressure sensor and a diaphragm can be disposed on the sealing member. In this example a fluid port can be attached to the base and compressingly engages the diaphragm creating a sealed chamber around the pressure sensor. The sealed chamber can be filled with a pressure transmissive fluid such as oil through a fill hole provided in the printed circuit board. This configuration allows the sensor package to be easily assembled with ordinary components and provides a design where all exposed surfaces of the package can be made from a highly corrosion resistive material.

Another media isolated pressure transducer involves deflecting a diaphragm differential pressure sensor is formed so all electrical elements and connections from external circuitry to the sensor are isolated from the pressure media. The deflecting, pressure sensing diaphragm is made of a semi-conductor material, having piezoresistors disposed on a surface thereof to form strain gages to sense deflection of the diaphragm. The strain gage resistors are media isolated by a layer that overlies the strain gage resistors.

Based on the foregoing, it can be appreciated that such prior art pressure sensor and transducer devices are plagued with a number of limitations. It is believed that a need exists for a low cost high accuracy media isolated pressure transducer that can be used in high temperature applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore, one aspect of the present invention to provide, an apparatus and a method which overcomes the above noted prior art limitations.

It is another aspect of the present invention to provide for an improved pressure sensor apparatus and method.

The aforementioned aspects and other objectives and advantages can now be achieved as described herein. A pressure sensor port apparatus and method are disclosed. A pressure sensor port can be formed comprising a hexagonal area. A majority of the hexagonal area preferably comprises a plastic material (e.g., thermoplastic). Additionally, one or more electronic interconnections can be associated with the pressure sensor port, such that the electronic interconnection (s) are isolated from sensed media while providing a pressure sensor port apparatus based on a cost effective injection molding process rather than a machining processes required for a metal. A pressure sensing diaphragm can be attached to the pressure sensor port by a weld. In general, at least 50% of a volume of the pressure sensor port apparatus comprises the plastic.

The embodiments described herein can provide for an improved technique for molding a suitable thermoplastic around a metal core with design features, along with an improved technique for welding, and the use of different threads for locking a media isolated pressure transducer to a desired application. Considerable cost savings can be achieved by using a small metal stock to machine the essential features of a pressure transducer. The bulk of the port which is the hexagonal area is preferably molded with a thermoplastic material.

For a media isolated pressure sensor, the media (e.g., gas or liquid) should not come in contact with the electrical/electronics interconnections. Pressure sensing diaphragms can be welded to pressure sensor port for high pressure applications. The embodiments can be configured to retain the welding feature of the pressure sensor port to which the diaphragms are attached. Approximately 50% of the volume of the part is plastic which lends itself to more cost effective injection molding process than machining process required for metals. The pressure sensor port can be implemented by using metal/plastic ports to configure a media isolated pressure transducer.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
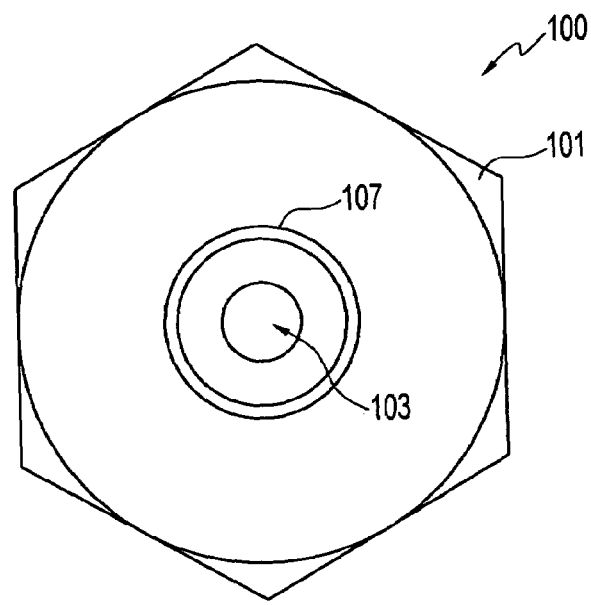
FIG. 1 illustrates a bottom view of a pressure sensor port, which can be implemented in accordance with a preferred embodiment.
Figure 2:
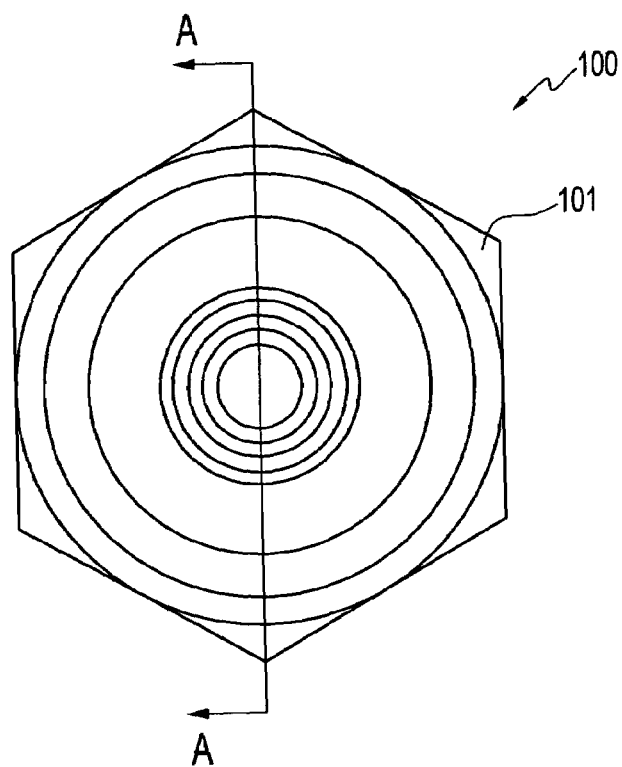
FIG. 2 illustrates a top view of the pressure sensor port depicted in FIG. 1 taken through a section A-A, in accordance with an alternative embodiment.
Figure 3:
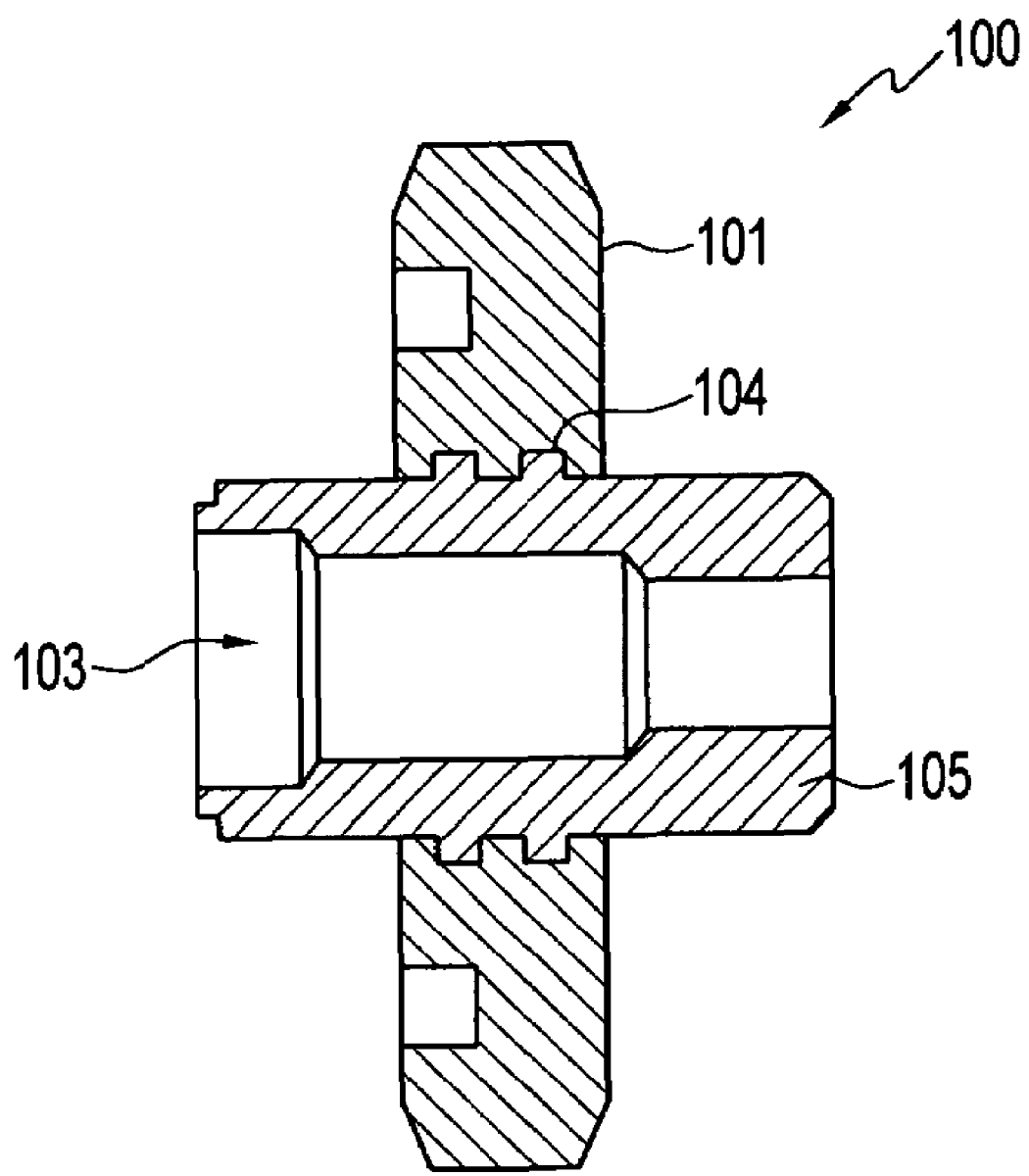
FIG. 3 illustrates a side sectional view of the pressure sensor port depicted in FIGS. 1-2, in accordance with a preferred embodiment.

FIG. 1 illustrates a bottom view of a pressure sensor port 100, which can be implemented in accordance with a preferred embodiment. Pressure sensor port 100 can be configured for use with a pressure sensor/transducer (not shown). FIG. 2 illustrates a top view of the pressure sensor port 100 depicted in FIG. 1 taken through a section A-A, in accordance with an alternative embodiment. FIG. 3 illustrates a side sectional view of the pressure sensor port 100 depicted in FIGS. 1-2 in accordance with a preferred embodiment of the present invention. Note that in FIGS. 1-3 identical or similar parts or elements are generally indicated by identical reference numerals.

Pressure sensor port 100 generally includes an injection molded plastic portion 101 that can function as a base in combination with a cavity 103 through a protruding portion 104 as depicted in greater detail in FIG. 3. The cavity 103 can be formed within the port 100 and can be surrounded by an internal metal part 105 of the pressure port 100. Cavity 103 can function in some embodiments as a fluid cavity and is formed as a passage through the metal part 105 of the pressure port 100. The cavity 103 is surrounded by and formed from the metal part 105. The protruding portion 104 can be configured from metal to allow the plastic (e.g., thermoplastic) to grip as a result of an injection molding process.

The protruding portion 104 can be formed in the shape of one or more convolutions. This facilitates molding of the pressure sensor port 100. The convolution or protruding portion(s) 104 can be preferably arranged concentrically with respect to the hexagonal base 101. The component 105 is generally composed of metal and can be configured to surround inner circles, which are also formed from metal, generally outlining the metal walls of the gap or cavity 103 formed within metal portion 105.

Pressure sensor port 100 depicted in FIG. 3 incorporates the injection molded portion or base 101 depicted in FIGS. 1-2. The base 101 and pressure port 100 is preferably configured from a metal/thermoplastic material. In general, the base 101 is provided as the "hex portion" of the pressure sensor port 100 and is injection molded about the metal part 105.

The pressure port 100 can be provided for pressure sensing applications, such that when the pressure port 100 is welded to a metal diaphragm (not shown), a pressure sensing apparatus or pressure transducer can be formed, which includes a metal diaphragm and the pressure port 100. The pressure port 100 can be welded to the any application by welding the external threads of the pressure port 100 to the application where in the threads are made of metal. Thus, the embodiments can be implemented by using metal/plastic ports to create media isolated pressure transducers.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A pressure port comprising:
   a metal portion comprising a cavity wherein the metal portion is cylindrical shaped, wherein the cavity runs longitudinally through the metal portion and wherein the metal portion comprises a protruding portion arranged circumferentially around the tube; and
   a hexagonally shaped plastic base comprising a plastic material wherein the metal portion passes through the center plastic base such that the hexagonal shape of the plastic base is concentric with the metal portion and with the cavity, wherein the metal portion and the plastic base are fastened together, and wherein the protruding portion helps keep the metal portion and the plastic base fastened.

2. The apparatus of claim 1 wherein said plastic material comprises thermoplastic.

3. The apparatus of claim 1 wherein a pressure sensing diaphragm is attachable to said pressure port by a weld.

4. The apparatus of claim 1 wherein approximately at least 50% of a volume of said pressure port comprises said plastic material.

5. The apparatus of claim 1 wherein the base entirely comprised of the plastic material.

6. The apparatus of claim 1 wherein said cavity comprises a fluid cavity through which a fluid is flowable.

7. A pressure port for use with a pressure sensor, comprising:
   a metal portion comprising a cavity wherein the metal portion is cylindrically shaped, wherein the cavity runs longitudinally through the metal portion and wherein the metal portion comprises a protruding portion arranged circumferentially around the tube;
   a hexagonally shaped plastic base comprising a plastic material wherein the metal portion passes through the center of plastic base such that the hexagonal shape of the plastic base is concentric with the metal portion and with the cavity, wherein the metal portion and the plastic base are fastened together, and wherein the protruding portion helps keep the metal portion and the elastic base fastened; and
   a means for electrical interconnection means is isolated from sensed media.

8. The apparatus of claim 7 Wherein the base is entirely comprised of the plastic material.

9. The apparatus of claim 8 wherein said cavity comprises a fluid cavity through which a fluid is flowable.

10. The apparatus of claim 7 wherein:
    said pressure sensor port comprises a fluid cavity through which a fluid is flowable.

11. A method for forming a pressure port for use with a pressure sensor, comprising:
    forming a metal portion comprising a cavity wherein the metal portion is cylindrically shaped, wherein the cavity runs longitudinally through the metal portion and wherein the metal portion comprises a protruding portion arranged circumferentially around the tube; and
    forming a hexagonally shaped plastic base centric to the metal portion and comprising a plastic material such that the hexagonal shape of the plastic base is concentric with the metal portion and with the cavity, wherein the metal portion and the plastic base are fastened together, and wherein the protruding portion helps keep the metal portion and the plastic base fastened.

12. The method of claim 11 wherein said plastic material comprises thermoplastic.

13. The method of claim 11 wherein a pressure sensing diaphragm is attachable to said pressure port by a weld.

14. The method of claim 11 wherein approximately at least 50% of a volume of said pressure port comprises said plastic material.

15. The method of claim 14 wherein:
    said pressure sensor port to comprise a fluid cavity through which a fluid is flowable.

16. The method of claim 11 further comprising configuring said pressure sensor port to comprise a fluid cavity.

* * * * *

UNITED STATES PATENT AND TRADEMARK OFFICE
CERTIFICATE OF CORRECTION

| | |
|---|---|
| PATENT NO. | : 7,373,830 B2 |
| APPLICATION NO. | : 11/410643 |
| DATED | : May 20, 2008 |
| INVENTOR(S) | : Thomas T. Thuruthumaly et al. |

It is certified that error appears in the above-identified patent and that said Letters Patent is hereby corrected as shown below:

In Column 6, line 11, after "a means for" add --electrically interconnecting the pressure sensor wherein the--

Signed and Sealed this

Nineteenth Day of August, 2008

JON W. DUDAS
*Director of the United States Patent and Trademark Office*